Jan. 1, 1957  H. J. MILLER  2,775,838
ICE FISHING ROD
Filed Dec. 13, 1952
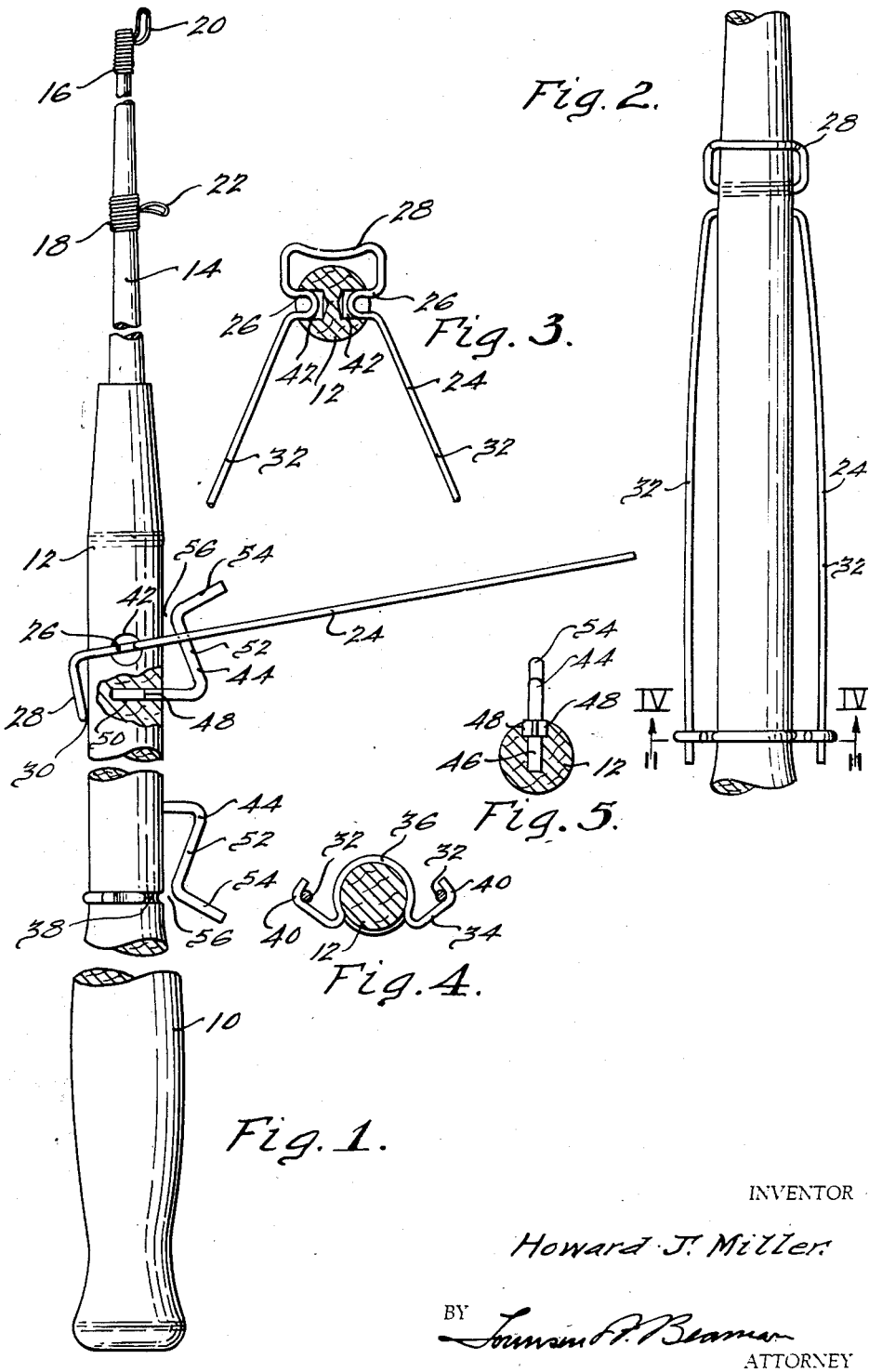
INVENTOR
Howard J. Miller
BY
ATTORNEY

United States Patent Office 2,775,838
Patented Jan. 1, 1957

2,775,838
ICE FISHING ROD
Howard J. Miller, Jackson, Mich.

Application December 13, 1952, Serial No. 325,781

2 Claims. (Cl. 43—21.2)

The present invention relates to improvements in fishing rods having particular reference to rods especially adapted to be used in ice fishing.

Fishing rods for ice fishing should be light and inexpensive as it is the practice to use more than one rod. Also, the rod should be designed to support itself on the ice with the tip of the rod positioned in the order of a foot above the hole in the ice. Another important feature is to provide a rod which does not become readily fouled by freezing weather or by handling in use or during transportation.

According to the invention, I have provided a light and durable yet inexpensive ice fishing rod having a tapered plastic shaft upon which coiled wire guides and tip are attached by being slid along the shaft followed by a contraction of the coils. A novel adjustable rest for supporting the rod on the ice has been provided along with an improved line holder.

The objects of the invention reside in the provision of a novel fishing rod having the construction, combination and arrangement of parts more fully set forth in the following specification and appended claims.

In the drawings,

Fig. 1 is an elevational view of my rod with the rest shown extended,

Fig. 2 is a view taken at 90° to Fig. 1 with the rest shown retracted,

Fig. 3 is a sectional view through the handle taken at the rest pivot,

Fig. 4 is a section taken on line IV—IV of Fig. 2, and

Fig. 5 is a detal of the line holder.

Referring to the illustrated form of the invention, the improved fishing rod 10 comprises a handle 12, a tapered shaft 14, preferably of suitable plastic material, a tip 16 and one or more line guides 18. The tip 16 and line guides 18 are shown of closely coiled wire construction with an intermediate coil being provided as extended loops 20 and 22. Because of the taper of the shaft 14 and the coiled construction of the tip 16 and guides 18, the tip 16 and guides 18 may be firmly fixed to the shaft 14 by sliding the same along the shaft 14 with an accompanying turning action tending to slightly unwind the coiled wire until a position of a tight or wedge fit is reached. Upon being released, the contraction of the coils will hold the tip 16 and line guides 18 in position on the shaft 14.

The rest 24 for supporting the rod 10 on the ice with the tip 16 above the hole in the ice takes the form of a wire bent into a generally V-shape with inwardly extending U-portions 26 collectively defining a pivot and an angular U-portion 28 defining a stop which abuts the handle 12 at 30 with the rest 24 extended.

In Figs. 2 and 4, the rest 24 is shown retracted with the legs 32 held parallel to the handle 12 by a formed wire rest clip 34 having a central U-portion 36 with a restricted throat which enables the clip 34 to be snapped into the groove 38 in the handle 12. By deflecting the legs 24 inwardly they are securely held in the retracted position of the rest 24 by being snapped into the notches 40.

As more clearly shown in Fig. 3, the pivot portions 26 are snapped into the recesses 42 in the handle 12 by spreading the legs 32. It will be understood that the offset of the portion 28 of the rest 24 provides the necessary clearance required to swing the rest 24 into the retracted position of Fig. 2.

A line holder has been provided on the handle 12 by a pair of similar bent wire parts 44 having leg portions 46 flattened to provide ears 48 which prevent rotation when the legs 46 are forced into the holes and the ears 48 are imbedded into the material of the handle 12 which may be of wood. The parallel portions 50 of the legs 46 receive the line wound thereon with the angular portions 52 holding the line in position as it is wound up and the flared portions 54 leading the line being wound through the restrictions 56.

Having thus described my invention what I claim as new and desire to be covered by Letters Patent is:

1. An ice fishing rod comprising a handle and a shaft having a tip, and a two-legged wire rest for supporting the rod in an inclined position on the ice with the tip elevated and the end of the handle resting on the ice to give a third point of support, said rest having a closed end and spread legs, portions of said rest between said closed end and said legs being formed to provide opposed pivot portions, recesses defined on opposite sides of said handle into which said pivot portions are pivotally received, said closed end embracing said handle to one side of said recess and being angularly disposed to the longitudinal axis of said legs to provide a stop engaging, in one pivotal position of said rest, with said handle, to limit the pivotal position of said rest relative to said handle with said legs in an extended position, and said stop having clearance with said handle with said rest in a retracted position whereby said legs be disposed along the longitudinal axis of said handle.

2. An ice fishing rod as defined in claim 1 having a wire clip attached to said handle and having arm portions with hooked outer ends engageable with said legs of said rest when in their retracted position.

References Cited in the file of this patent
UNITED STATES PATENTS

| | | |
|---|---|---|
| 754,094 | Roth | Mar. 8, 1904 |
| 824,333 | Bassick | June 26, 1906 |
| 1,092,548 | Weber | Apr. 7, 1914 |
| 1,233,507 | Reynolds | July 17, 1917 |
| 1,596,752 | Mitchell | Aug. 17, 1926 |
| 1,776,354 | Edmonds | Sept. 23, 1930 |
| 2,239,227 | Gunnufson | Apr. 22, 1941 |
| 2,470,610 | Elsemore | May 17, 1949 |
| 2,487,094 | Brown | Nov. 8, 1949 |
| 2,512,151 | Harrison | June 20, 1950 |
| 2,543,569 | Dusatko | Feb. 27, 1951 |
| 2,548,351 | Combs | Apr. 10, 1951 |
| 2,596,835 | Benge | May 13, 1952 |
| 2,623,317 | DeMaria | Dec. 30, 1952 |